(12) United States Patent
Asada

(10) Patent No.: US 6,318,530 B1
(45) Date of Patent: Nov. 20, 2001

(54) PRESSURE CONTROL APPARATUS AND METHOD FOR CONTROLLING A HYDRAULIC CLUTCH DEVICE

(75) Inventor: Akihiro Asada, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 09/491,021

(22) Filed: Jan. 25, 2000

(30) Foreign Application Priority Data

Jan. 28, 1999 (JP) .................................................. 11-020132

(51) Int. Cl.[7] .............................. B60K 41/22; B60K 20/02
(52) U.S. Cl. ..................... 192/3.58; 192/3.63; 192/109 F; 477/80; 477/86
(58) Field of Search .................................. 192/3.58, 3.63, 192/87.12, 87.13, 109 F; 477/80, 86

(56) References Cited

U.S. PATENT DOCUMENTS

| | | | | |
|---|---|---|---|---|
| 4,843,902 | * | 7/1989 | Patton et al. ...................... | 192/3.58 X |
| 4,855,913 | * | 8/1989 | Brekkestran et al. .............. | 477/80 X |
| 4,989,470 | | 2/1991 | Bulgrien .................................. | 74/335 |
| 5,040,648 | * | 8/1991 | Mitchell et al. ..................... | 192/3.58 |
| 5,053,960 | * | 10/1991 | Brekkestran et al. .................. | 701/51 |
| 5,083,647 | | 1/1992 | Bulgrien ............................... | 192/3.58 |
| 5,101,688 | | 4/1992 | Pearce et al. ......................... | 74/861 |
| 5,101,943 | | 4/1992 | Bulgrien ............................... | 192/3.63 |
| 5,138,905 | * | 8/1992 | Kouno .................................... | 477/80 |
| 5,353,662 | * | 10/1994 | Vaughters ........................... | 74/336 R |

* cited by examiner

Primary Examiner—Rodney H. Bonck
(74) Attorney, Agent, or Firm—Webb Ziesenheim Logsdon Orkin & Hanson, P.C.

(57) ABSTRACT

A pressure control apparatus and method are provided for controlling hydraulic clutches of a backward and forward drive switching device mounted in a transmission of a working vehicle such as a tractor. When a backward and forward drive switching shuttle lever is operated, a current supplied to an electromagnetic proportional valve is controlled to gradually increase the pressure for a hydraulic clutch corresponding to a direction of movement. When a propelling drive connecting and disconnecting clutch pedal is operated, the pressure for that hydraulic clutch is controlled through the electromagnetic proportion valve, based on a depressed position of the pedal. When the operator switches the shuttle lever from forward to backward or vice versa, a microcomputer causes the shuttle control current to rise at a point of time of start of a clutch engaging operation of the clutch pedal.

4 Claims, 7 Drawing Sheets

PRESSURE CONTROL APPARATUS AND METHOD FOR CONTROLLING A HYDRAULIC CLUTCH DEVICE

BACKGROUND OF THE INVENTION

1. Technical Field of the Invention

This invention relates to a pressure control apparatus for hydraulic clutches in a working vehicle such as a tractor, and to a method of executing such control.

2. Prior Art of the Invention

To perform backward and forward drive switching efficiently, a working vehicle such as a tractor provides the same number of speeds for forward drive and backward drive, and includes a hydraulically operable backward and forward drive switching device disposed in an upstream position of a transmission in a propelling drive transmitting line extending from an engine, so that drive switching may be carried out frequently.

Such a backward and forward drive switching device has a large hydraulic capacity, and breaks the propelling drive transmission by disengaging backward and forward drive hydraulic clutches with respect to both backward and forward sides thereof Thus, the drive switching device is assigned to the functions of both a main clutch and an inching clutch. The drive switching device acting to perform such functions dispenses with the main clutch between the engine and the transmission.

Consequently, the hydraulic clutches of the backward and forward drive switching device are controllable by operating commands transmitted through two lines, one of which is given by a switching operation of a shuttle lever for backward and forward drive switching, and the other by depression of a clutch pedal for making and breaking the propelling drive transmission.

The control by the shuttle lever is intended to effect a smooth drive switching. Specifically, two microswitches are provided for electrically detecting forward and backward positions of the lever, respectively. From the time one of the microswitches for detecting the forward and backward positions is turned on, the pressure for the hydraulic clutch corresponding to the selected direction is gradually increased for a fixed time.

The above control is called a modulated pressure control. In the modulated pressure control, a microcomputer controls a current applied to an electromagnetic proportional pressure reducing valve. This renders a pressure increase pattern of pressure oil supplied to the hydraulic clutch optimal for drive switching.

On the other hand, the control by the clutch pedal is based on a clutch pedal sensor for detecting a clutch pedal position (i.e. a position to which the pedal is raised for clutch engagement after being depressed for clutch disengagement). In response to the pedal position detected, the electromagnetic proportional pressure reducing valve is operated to control the pressure for the selected hydraulic clutch. This construction provides the operator with the same operational feeling as when operating an ordinary mechanical clutch.

The pressure increase pattern provided by operation of the clutch pedal is set for each speed by the microcomputer. The pedal is operable with the same feeling for selecting any speed.

In the above conventional backward and forward drive switching device, the backward and forward drive hydraulic clutches are used both as shuttle clutches (backward and forward drive clutches) and a main clutch (drive connecting and disconnecting clutch). Thus, it is necessary to select the pressure instructed by operation of the shuttle lever or the pressure instructed by operation of the clutch pedal, and apply a current as instructed to the pressure regulating valve based on the pressure selected.

Preferably, this selection is made with priority given to the instruction or command occurring later, by taking the inching control of the clutch pedal (i.e. a quick engaging operation repeating a switching between clutch disengagement and half clutching) into account.

However, where the quick engaging operation by the clutch pedal is given priority, an operation of the shuttle lever for an opposite traveling direction (from forward to neutral and to backward, or from backward to neutral and to forward) results in a pressure increase for a different one of the clutches. This would generate shocks to impair a smooth backward and forward drive switching.

A primary object of this invention is to provide a pressure control apparatus and method for controlling a hydraulic clutch device which overcome the disadvantage noted above.

SUMMARY OF THE INVENTION

The above object is fulfilled, according to this invention, by a pressure control method applicable to a hydraulic clutch device mounted in a transmission of a vehicle, the hydraulic clutch device having a forward drive hydraulic clutch and a backward drive hydraulic clutch, a propelling drive connecting and disconnecting pressure supplied to each hydraulic clutch being controllable based on a depressed position of a clutch pedal, a backward and forward drive switching pressure supplied to each hydraulic clutch being controllable on and off through an electromagnetic valve and modulate-controllable through an electromagnetic proportional valve in response to an operation in a forward direction or backward direction of a shuttle lever, the pressure control method comprising the steps of:

operating the electromagnetic valve, when the shuttle lever is operated, to permit backward and forward drive switching pressure oil to be supplied to a hydraulic clutch connected to the electromagnetic valve, and gradually increasing the pressure of the pressure oil through the electromagnetic proportional valve;

supplying propelling drive connecting and disconnecting pressure oil to the hydraulic clutch connected, through the electromagnetic proportional valve, in response to a depressed position of the clutch pedal when the clutch pedal is operated for clutch engagement; and electrifying the electromagnetic proportional valve after a detection of start of a clutch engaging operation of the clutch pedal, when the shuttle lever is operated from forward to backward or vice versa, to gradually increase, through the electromagnetic proportional valve, the hydraulic pressure supplied to the hydraulic clutch corresponding to a side to which the lever is switched.

According to the above method, when the operator operates the shuttle lever for an opposite traveling direction, i.e. from forward to backward or from backward to forward, electrification of the electromagnetic proportional valve (electromagnetic proportional pressure reducing valve) waits until the clutch pedal switches from a disengaging position to an engaging position, regardless of which control command occurs earlier (regardless of which reaches a microcomputer unit first). After the clutch pedal is placed in the engaging position, the microcomputer unit electrifies the electromagnetic proportional valve to effect the control (modulated control) for gradually increasing the hydraulic pressure supplied to the hydraulic clutch.

Thus, the vehicle may be switched smoothly from forward running to backward running or vice versa without the operator feeling a shock which would occur when the clutch pedal engages the clutch quickly.

Other features, functions, effects and advantages of the present invention will be appreciated upon reading the following description with reference to the accompanying drawings.

BRIEF DESCRIPTION OF THE DRAWINGS

FIGS. 1 through 6 show an embodiment of this invention applied to a transmission of an agricultural tractor, in which:

DESCRIPTION OF THE PREFERRED EMBODIMENT OF THE INVENTION

A preferred embodiment of this invention will be described hereinafter with reference to the drawings.

Figure 1:
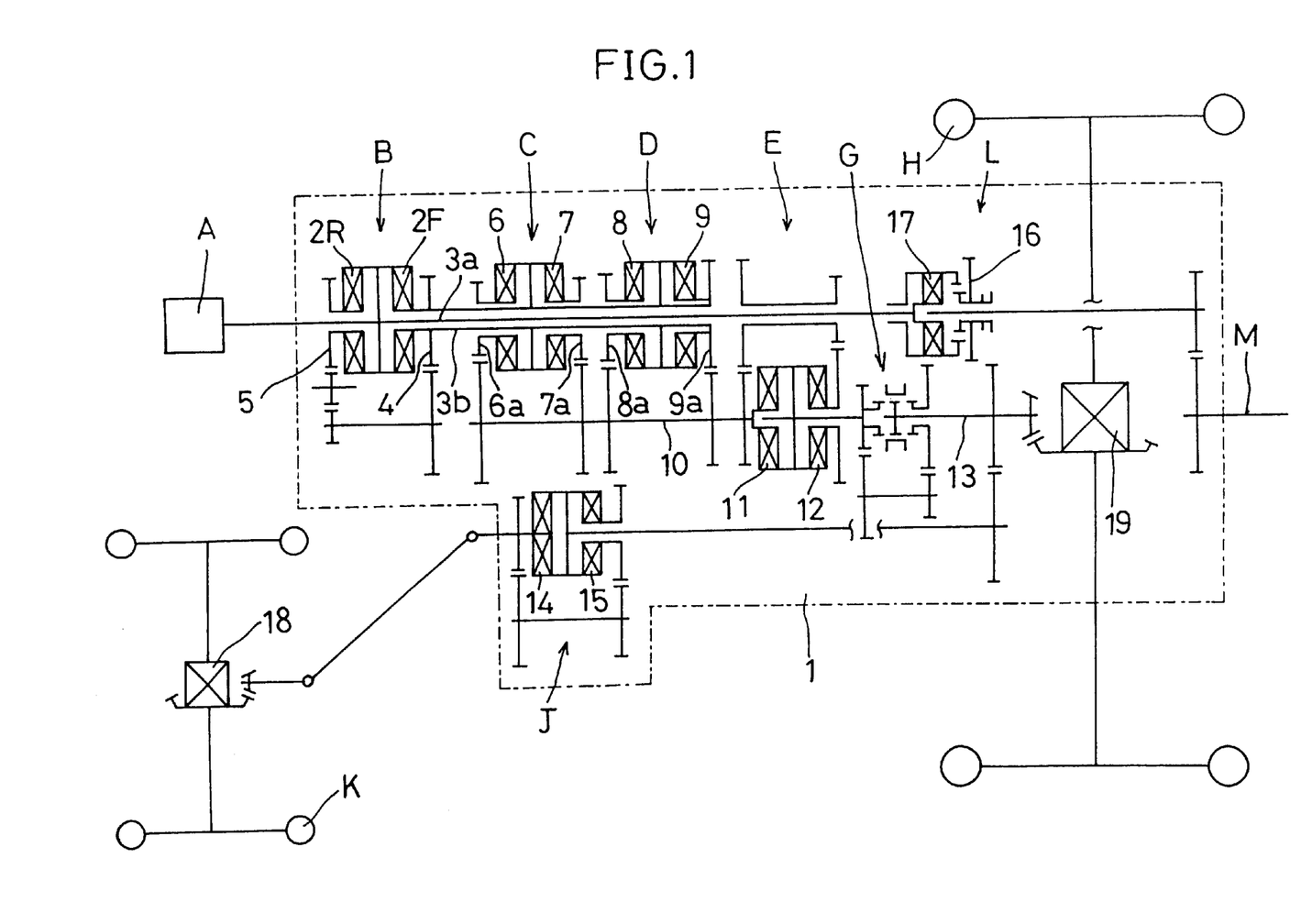
FIG. 1 is a schematic view of the transmission of the tractor.
Figure 2:
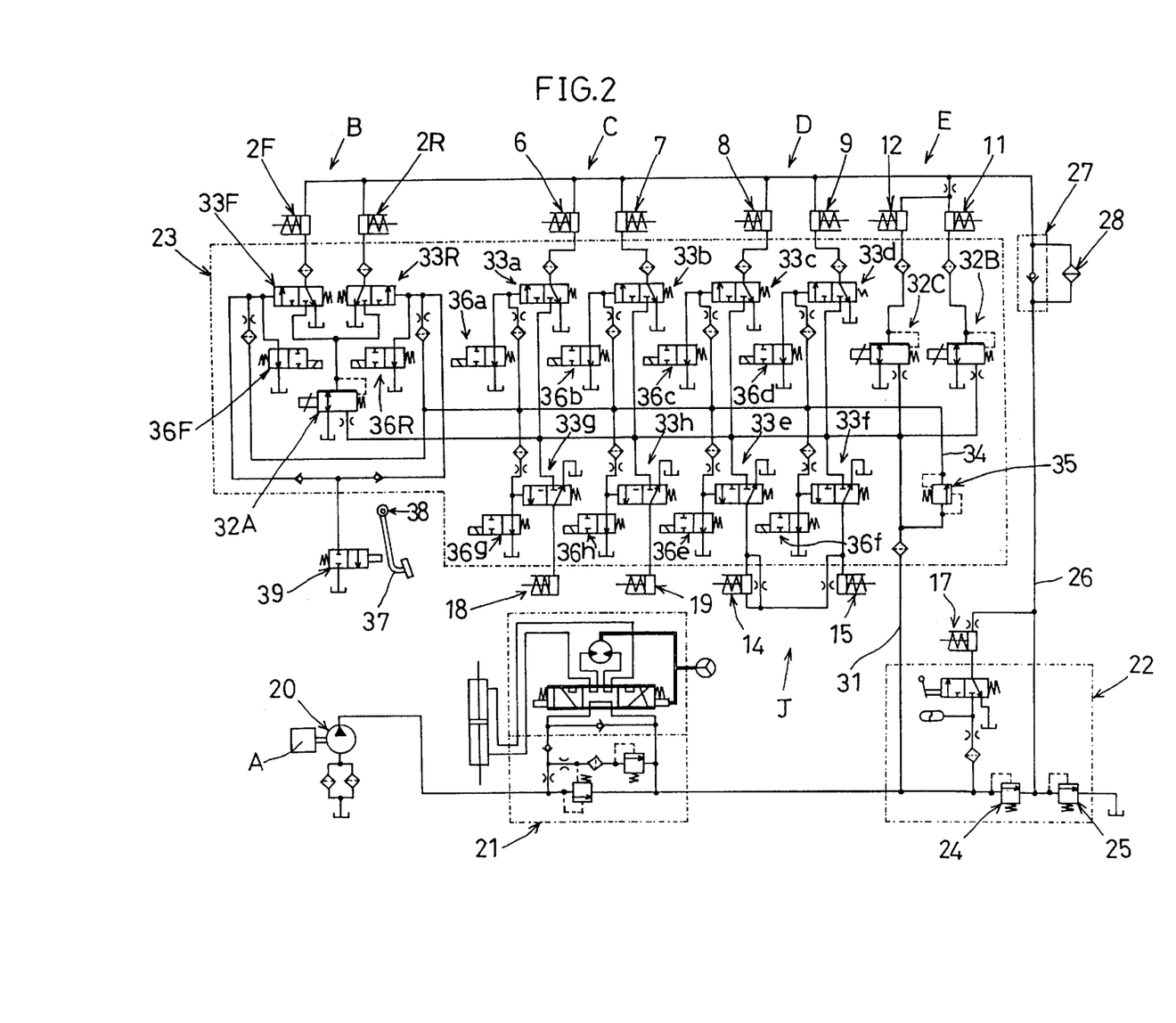
FIG. 2 is a schematic view of a hydraulic circuit for controlling the transmission shown in FIG. 1.

FIG. 1 shows a transmission 1 of an agricultural tractor employing the method of controlling the pressure of a hydraulic clutch device according to this invention. FIG. 2 shows a hydraulic circuit of transmission 1.

Power of an engine A is transmitted through a backward and forward drive switching device B (one example of hydraulic clutch devices) disposed in an upstream position in the transmission 1, to a first change speed device C for providing a first speed and a second speed, and a second change speed device D for providing a third speed and a fourth speed. Subsequently, the power is transmitted to rear wheels H through a main, high and low, change speed device E and an auxiliary change speed device F, and to front wheels K through a front wheel change speed device J. The power of engine A is transmitted also to a PTO shaft M through a PTO change speed device L.

The backward and forward drive switching device B selects a forward rotation gear 4 or a reversing gear 5 by means of a forward drive hydraulic clutch 2F or a backward drive hydraulic clutch 2R. As a result, power transmitted from the engine A to a main shaft 3a is transmitted to a tubular shaft 3b as forward drive or backward drive. The backward and forward drive switching device B acts also as a main propelling clutch of the tractor. Propelling drive is disconnected by disengaging the clutches 2F and 2R at the same time.

The first change speed device C fixes a first speed gear 6a or a second speed gear 7a to the tubular shaft 3b by means of a hydraulic clutch 6 or 7. The first or second forward or backward speed thereby provided is transmitted to a counter shaft 10. The second change speed device D fixes a third speed gear 8a or a fourth speed gear 9a to the tubular shaft 3b by means of a hydraulic clutch 8 or 9. The third or fourth forward or backward speed thereby provided is transmitted to the counter shaft 10.

The main, high and low, change speed device E transmits one of the four forward or backward speeds from the counter shaft 10 to the auxiliary change speed device G after changing it to a higher speed or a lower speed by means of a hydraulic clutch 11 and 12.

The auxiliary change speed device G is operable for further changing the speed of power received from the main change speed device E and transmitting it to a bevel pinion shaft 13. The auxiliary change speed device G is a mechanical change speed device including a shift gear switchable by a hand lever (not shown).

The front wheel change speed device J transmits the power from the bevel pinion shaft 13 to the front wheels K. This change speed device J includes hydraulic clutches 14 and 15 to be switchable between a mode for driving the front wheels K at substantially the same peripheral speed as the rear wheels H and a mode for driving the front wheels K faster than the rear wheels H.

The PTO change speed device L includes a change gear 16 manually operable to switch the power transmitted to the PTO shaft M between "ground power" and "live power", and a hydraulic clutch 17 for connecting and disconnecting the "live power". The "ground power" herein refers to the power from the engine A inputted to the PTO change speed device L after being changed to substantially the same speed as the drive wheels (rear wheels or four wheels) by the change speed devices C, D, E and G. The "live power" refers to the power inputted directly from the engine A to the PTO change speed device L through the main shaft 3a, which substantially corresponds to a rotating speed of the main shaft 3a.

Differentials of the front wheels K and rear wheels H have hydraulic differential locks 18 and 19, respectively.

Referring to FIG. 2, pressure oil is discharged from a hydraulic pump 20 driven by the engine A, and supplied to a change speed shift valve 23 through a steering wheel controller 21 and a PTO clutch valve 22.

The PTO clutch valve 22 includes a system pressure relief valve 24 and a lubrication pressure relief valve 25. A lubricating oil line 26 has a check valve 27 and an oil cooler 28 mounted thereon.

Pressure oil in a pressure oil line 31 may be supplied to an electromagnetic proportional pressure reducing valve 32A and to two main spools, i.e. a main spool 33F for forward drive and a main spool 33R for backward drive. The pressure oil in the pressure oil line 31 may be supplied to the hydraulic clutches 6 and 7 of the first main change speed device C through main spools 33a and 33b, to the hydraulic clutches 8 and 9 of the second main change speed device D through main spools 33c and 33d, to the hydraulic clutches 14 and 15 of the front wheel change speed device J through main spools 33e and 33f, and to the hydraulic differential locks 18 and 19 of the front wheels K and rear wheels H through main spools 33g and 33h. Further, the pressure oil in the pressure oil line 31 may be supplied to the to the hydraulic clutches 11 and 12 of the main, high and low, change speed device E through electromagnetic proportional pressure reducing valves 32B and 32C.

Main spools 33F, 33R and 33a–33h are connected to a pilot oil line 34 branched from the pressure oil line 31 to be operable by pilot oil taken out through a relief valve 35 for pilot pressure. The main spools 33F, 33R and 33a–33h have electromagnetic valves 36F, 36R and 36a–36h for controlling the pilot pressure, respectively.

The pilot pressures acting on the main spools 33F and 33R are controllable also by a clutch pedal sensor 38 operable by a clutch pedal 37. The clutch pedal sensor 38 electrically detects an angle of pivotal movement of the clutch pedal 37, thereby detecting a clutch pedal position (i.e. a position to which the pedal 37 is raised for clutch engagement after being depressed for clutch disengagement). Numeral 39 denotes a safety valve for shutting the oil line from the clutch pedal 37 when the pedal 37 is operated for clutch disengagement.

All the valves noted above are controllable by a microcomputer unit 40 (one example of control devices).

Figure 3:
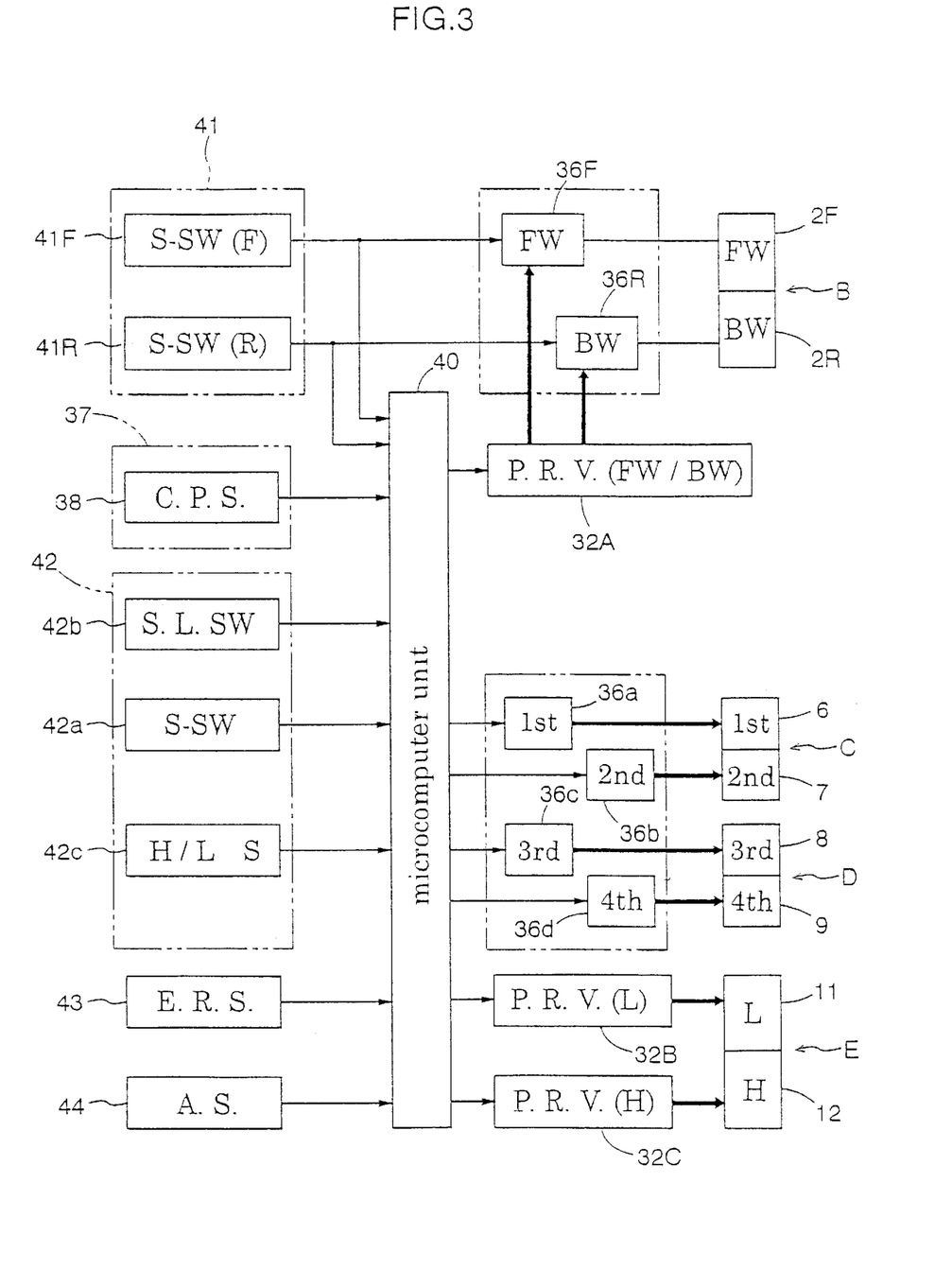
FIG. 3 is a schematic view illustrating speed controls by a microcomputer unit.

As shown in FIG. 3, this microcomputer unit 40 has, connected thereto, shuttle switches 41F and 41R operable by backward and forward switching of a shuttle lever 41, the clutch pedal sensor 38, e.g. a potentiometer, operable by depression of the clutch pedal 37, a shift switch 42a operable by a shift button (not shown) of a shift lever device 42, a shift lock switch 42b operable by a lock button (not shown) of shift lever device 42, a high/low change speed switch 42c operable by rocking of a shift lever (not shown), an engine rotation sensor 43, and an accelerator sensor 44. The microcomputer unit 40 is constructed to control the electromagnetic proportional pressure reducing valves 32A–32C and electromagnetic valves 36F, 36R and 36a–36h.

Specifically, when the shift button of shift lever device 42 is operated, the pressure of one of the first to fourth hydraulic clutches 6–9 is increased or decreased. In time of this shifting operation, the pressure of high and low change speed clutches 11 and 12 is modulate-controlled through the electromagnetic proportional pressure reducing valves 32B and 32C to reduce shocks accompanying the shifting operation.

The pressure of high and low change speed clutches 11 and 12 is set and controlled by inferring a load acting on the engine A from an output of accelerator sensor 44 and an output of engine rotation sensor 43, and computing an optimal pressure for the load.

With a backward and forward switching of shuttle lever 41, a selection is made between the shuttle switches 41F and 41R formed, for example, of microswitches. As a result, one of the electromagnetic valves 36F and 36R is operated, and pressure oil is supplied under modulated pressure control through the electromagnetic proportional pressure reducing valve 32A to the hydraulic clutch 2F or 2R corresponding to the selected direction.

As the clutch pedal 37 is moved gradually from a depressed position to a clutch engaging position, the clutch pedal sensor 38 detects current variations. Based on the current variations, the electromagnetic proportional pressure reducing valve 32A is controlled to supply pressure oil under pressure control to the two hydraulic clutches 2F and 2R at the same time.

Further, the two hydraulic clutches 2F and 2R may be disengaged at the same time by operating the lock button of shift lever device 42.

The control of the hydraulic clutches 2F and 2R of backward and forward drive switching device B by the shuttle lever 41 is a modulated pressure control as noted above. This modulated pressure control is performed as follows.

The forward and backward positions of shuttle lever 41 are electrically detected by the shuttle switches 41F and 41R. Based on the detection, the electromagnetic valve 36F or 36R corresponding to the shuttle switch 41F or 41R turned on is operated to switch the main spool 33F or 33R having one end thereof connected to this electromagnetic valve. The electromagnetic proportional pressure reducing valve 32A is connected to the other ends of main spools 33F and 33R. Thus, by controlling the current applied to the electromagnetic proportional pressure reducing valve 32A, the pressure for the hydraulic clutch 2F or 2R increases gradually for a fixed time, thereby effecting a smooth switching. The hydraulic clutches 2F and 2R have a pressure increase pattern controlled by the microcomputer unit 40 to be optimal for change speed.

The shuttle lever 41 has a neutral position though not lockable thereto. When the shuttle lever 41 is placed in the neutral position, the shuttle switches 41F and 41R are both turned off.

On the other hand, the control in response to the clutch pedal 37 is performed as follows.

When a position of clutch pedal 37 is detected by the clutch pedal sensor 38, the electromagnetic proportional pressure reducing valve 32A controls the pressure of both hydraulic clutches 2F and 2R based on the position detected. This allows the operator to operate the clutches with the same operational feeling as when operating an ordinary mechanical clutch. Moreover, the pressure increase pattern of hydraulic clutches 2F and 2R is set for each speed by the microcomputer unit 40. The operator can select any speed with the same operational feeling as when operating an ordinary mechanical clutch.

The hydraulic clutches 2F and 2R of backward and forward drive switching device B are used both as shuttle clutches (backward and forward drive clutches) and a main clutch (drive connecting and disconnecting clutch). That is, the hydraulic clutches 2F and 2R are controllable by operating commands transmitted through two lines, one of which is given by a switching operation of shuttle lever 41 for backward and forward drive switching, and the other by depression of clutch pedal 37 for connecting and disconnecting the propelling drive transmission. Thus, ultimately, it is necessary to select the pressure instructed by operation of shuttle lever 41 or the pressure instructed by operation of clutch pedal 37, and apply a current as instructed to the pressure regulating valve based on the pressure selected. This selection is made based on which of the two commands is given later in time or which command is for the lower pressure.

In this embodiment, the above pressure regulating valve is the electromagnetic proportional pressure reducing valve 32A. The pressure reducing valve 32A is a spool valve having a spool, a solenoid and a spring. This spool is biased by the spring in a direction to close the oil line. The solenoid, when electrified, imparts a force by a current supplied thereto to move the spool against the spring's biasing force in the direction to open the oil line. The spool is returned in the line closing direction by a force proportional to the pressure at a drain port, and stops in a position balancing the force of the solenoid. That is, a pressure corresponding to the current flowing to the solenoid is generated at the drain port of the spool.

Figure 4:
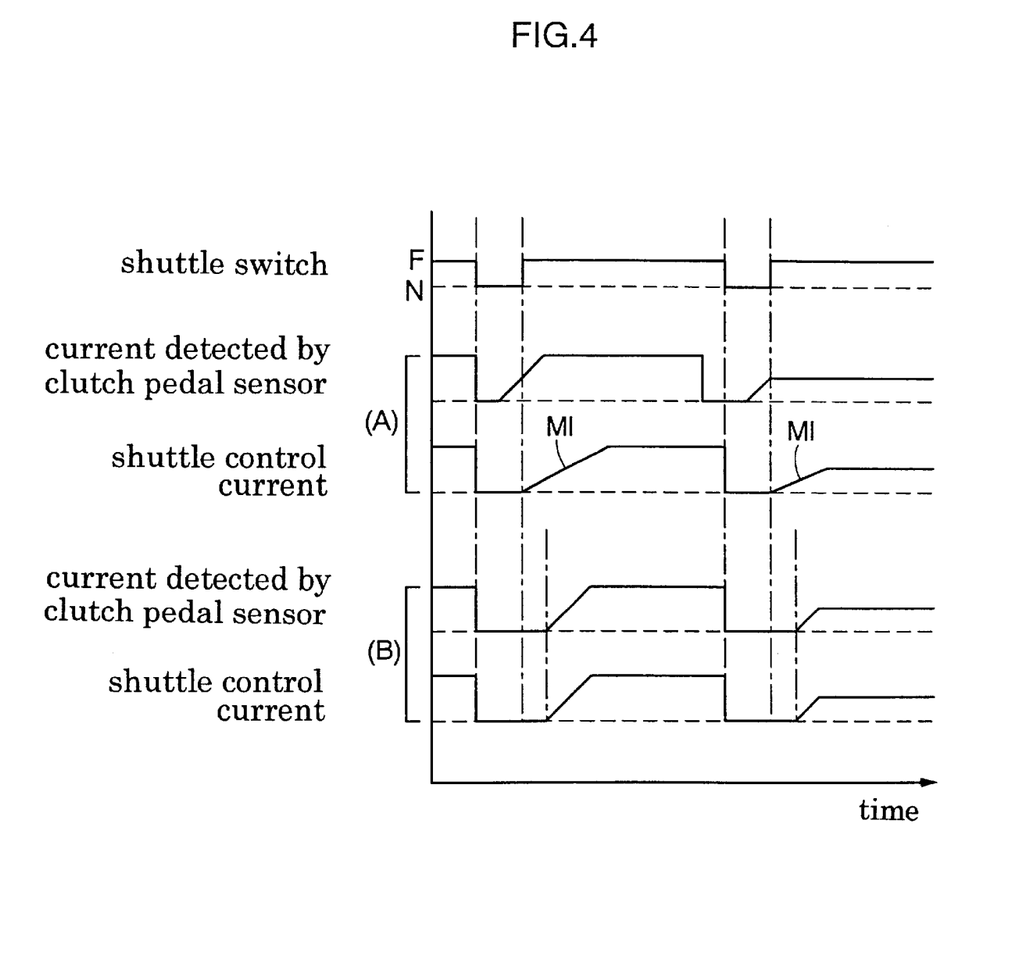
FIG. 4 is a view illustrating variations of a shuttle control current occurring when a shuttle lever is switched for the same traveling direction.

FIG. 4 shows variation patterns of shuttle control currents occurring when the shuttle lever 41 is switched for the same traveling direction. The shuttle control currents herein refer to currents flowing to the solenoid of the electromagnetic proportional pressure reducing valve 32A. In the illustrated example, the shuttle lever 41 is switched from forward to neutral and to forward again. A similar pattern occurs when the shuttle lever 41 is switched from backward to neutral and to backward again.

Figure 5:
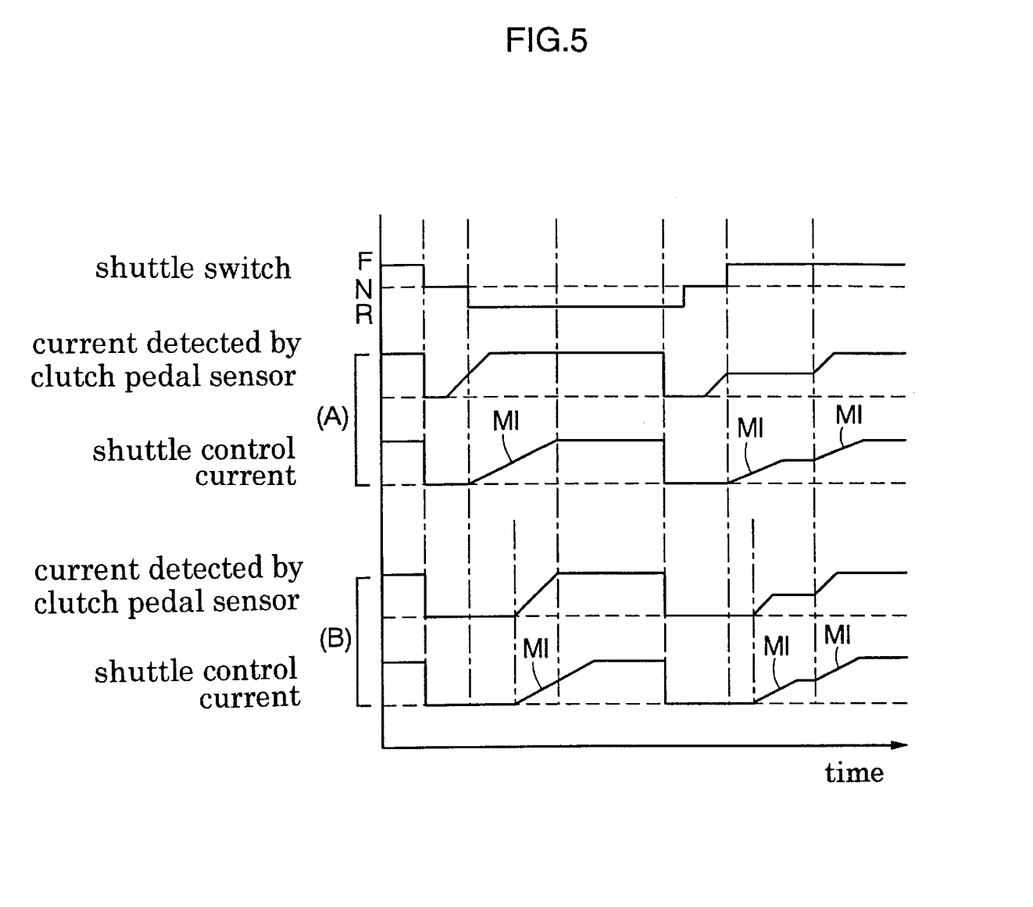
FIG. 5 is a view illustrating variations of the shuttle control current occurring when the shuttle lever is switched for an opposite traveling direction.
Figure 7:
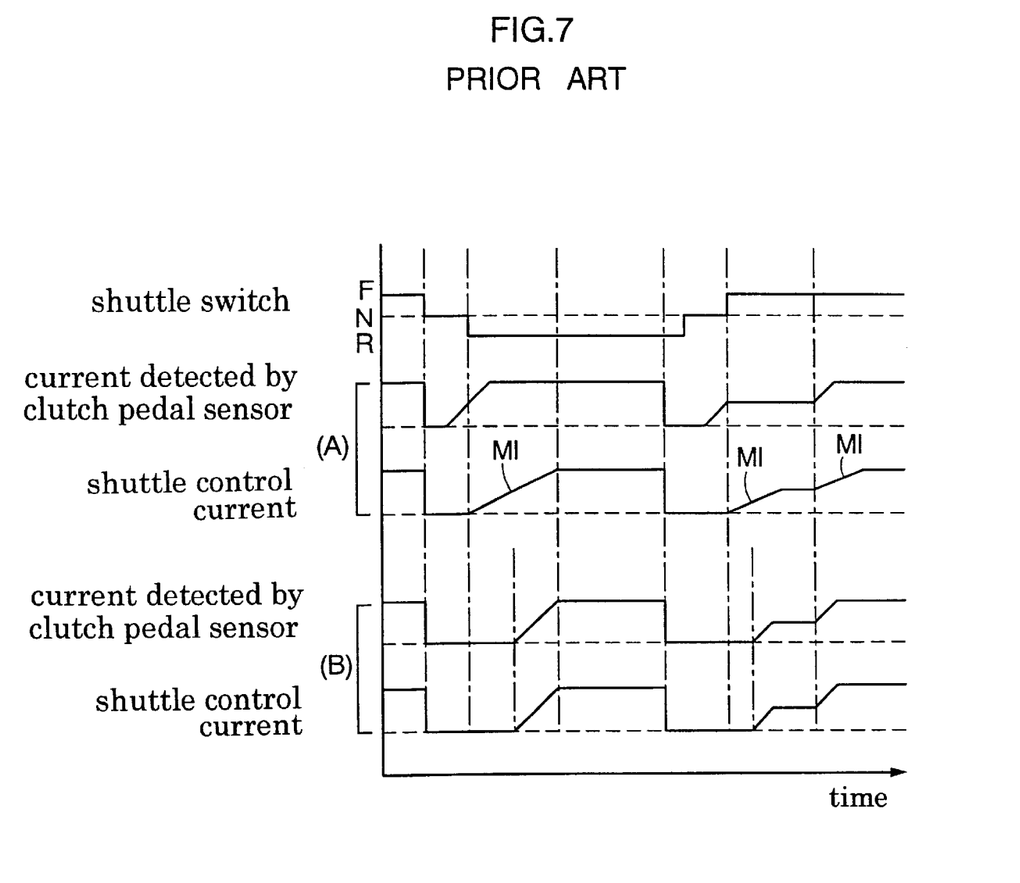
FIG. 7 is a view, for comparison with FIG. 5, illustrating variations of a conventional shuttle control current occurring when a shuttle lever is switched for an opposite traveling direction.

In FIGS. 4, 5 and 7, portions of the shuttle control currents put to the modulated control are indicated by sign MI.

In FIG. 4 (A), the clutch pedal sensor 38 first gives a clutch engaging command to the microcomputer unit 40. Subsequently, the shuttle lever 41 gives a command for switching from forward to neutral and to forward (the switching command of shuttle lever 41 being transmitted to the microcomputer unit 40 from the shuttle switch 41F or 41R turned on as a result of electrically detecting the forward or backward drive position of lever 41). In this case, even though the clutch pedal sensor 38 first gives the clutch engaging command, the command from the shuttle switch 41F turned on has priority to increase the shuttle control current with a characteristic set by the microcomputer unit 40. Consequently, the hydraulic pressure for engaging the forward drive hydraulic clutch 2F also is increased, describing a pressure increase pattern (similar to the shuttle control current shown) to effect a smooth engagement.

However, when the clutch pedal 37 is in a half-clutch position, as shown at the right side of (A), the shuttle control current is increased only to a current value corresponding to the half-clutch position. The hydraulic pressure for the forward drive hydraulic clutch 2F also is set by the lower current value.

In FIG. 4 (B), as opposed to (A), the shuttle lever 41 first gives a command for switching from forward to neutral and to forward to the microcomputer unit 40. Subsequently, the clutch pedal sensor 38 gives a clutch engaging command. In this case, the shuttle control current switches from halfway of the increase pattern set by the microcomputer unit 40 to the control based on the command from the clutch pedal sensor 38. Then the forward drive hydraulic clutch 2F is controlled by the current corresponding to the position of clutch pedal 37.

In this case, only the forward drive hydraulic clutch 2F is engaged, disengaged and engaged again. Since the pressure is increased only for the same clutch, even a sharp pressure increase is within a range of anticipation by the operator and causes no problem. The operational feeling is the same as in the inching control effected through the clutch pedal 37.

FIG. 5 shows variation patterns of shuttle control currents occurring when the shuttle lever 41 is switched for an opposite traveling direction. It is assumed in the illustrated example that the shuttle lever 41 is switched from forward to neutral, backward, neutral and to forward again. In the first half of (A) and (B), the operator operates the clutch pedal 37 from a disengaging position to a fully engaging position at a fixed speed. In the second half, that is when returning from backward drive to forward drive through neutral, the clutch pedal 37 is operated from the disengaging position to the fully engaging position through the half-clutch position.

In FIG. 5 (A), the clutch pedal sensor 38 first gives a clutch engaging command to the microcomputer unit 40. Subsequently, the shuttle lever 41 gives a command for switching from forward to neutral and to backward. In this case, even though the clutch pedal sensor 38 first gives the clutch engaging command, the command from the shuttle switch 41R turned on has priority to increase the shuttle control current with a characteristic set by the microcomputer unit 40.

As shown in the second half of (A), when the clutch pedal 37 in the half-clutch position, the shuttle control current is increased only to the current value corresponding to that position. The hydraulic pressure for the forward drive hydraulic clutch 2F also is set by the lower current value.

The control method shown in FIG. 5 (A) is the same as the conventional control method shown in FIG. 7 (A).

In FIG. 7 (B), as opposed to the above, the shuttle lever 41 first gives a command for switching from forward to neutral and to backward to the microcomputer unit 40. Subsequently, the clutch pedal sensor 38 gives a clutch engaging command. In this case, the shuttle control current switches from halfway of the increase pattern set by the microcomputer unit 40 to the control based on the command from the clutch pedal sensor 38. Then the backward drive hydraulic clutch 2R is controlled by the current corresponding to the position of clutch pedal 37.

Where, for example, a half-clutch state provided in a halfway portion, no strong shock occurs since the current increasing rate of clutch pedal sensor 38 (i.e. clutch engaging speed) is lower than the increase characteristic of the shuttle control current. However, when the clutch pedal 37 is raised quickly immediately after the shuttle switch 41R is turned on (substantially simultaneously therewith), resulting in a sharp increase in the current of clutch pedal sensor 38, a shock will occur since the backward drive hydraulic clutch 2R suddenly operates after the forward drive hydraulic clutch 2F.

To avoid such an inconvenience, this invention employs the control shown in FIG. 5 (B) in place of the control shown in FIG. 7 (B).

In FIG. 5 (B), when the clutch pedal sensor 38 gives a clutch engaging command to the microcomputer unit 40 after the shuttle lever 41 gives a command for switching from forward to neutral and to backward, the shuttle control current is set to rise after detecting the clutch engaging command from the sensor 38.

That is, the shuttle control current flows upon start of a clutch engaging operation of clutch pedal 37 (i.e. detection of a start of the current rise of clutch pedal sensor 38). In addition, the hydraulic clutch 2R is subjected to the modulated pressure control. A sharp increase in the shuttle control current is restrained in this way.

Thus, a rise of the shuttle control current takes place simultaneously with a start of clutch engaging operation of clutch pedal 37. A subsequent current rise follows the increase pattern modulated by the microcomputer unit 40. When the operator places the clutch pedal 37 in the half-clutch position, the current value is controlled in response to the half-clutch operation.

With the above controls, even when the shuttle lever 41 and clutch pedal 37 are operated substantially at the same time, and even where priority is given to the command occurring later, the operator can engage the forward and backward drive hydraulic clutches 2F and 2R smoothly and normally regardless of a slight time lag.

Figure 6:
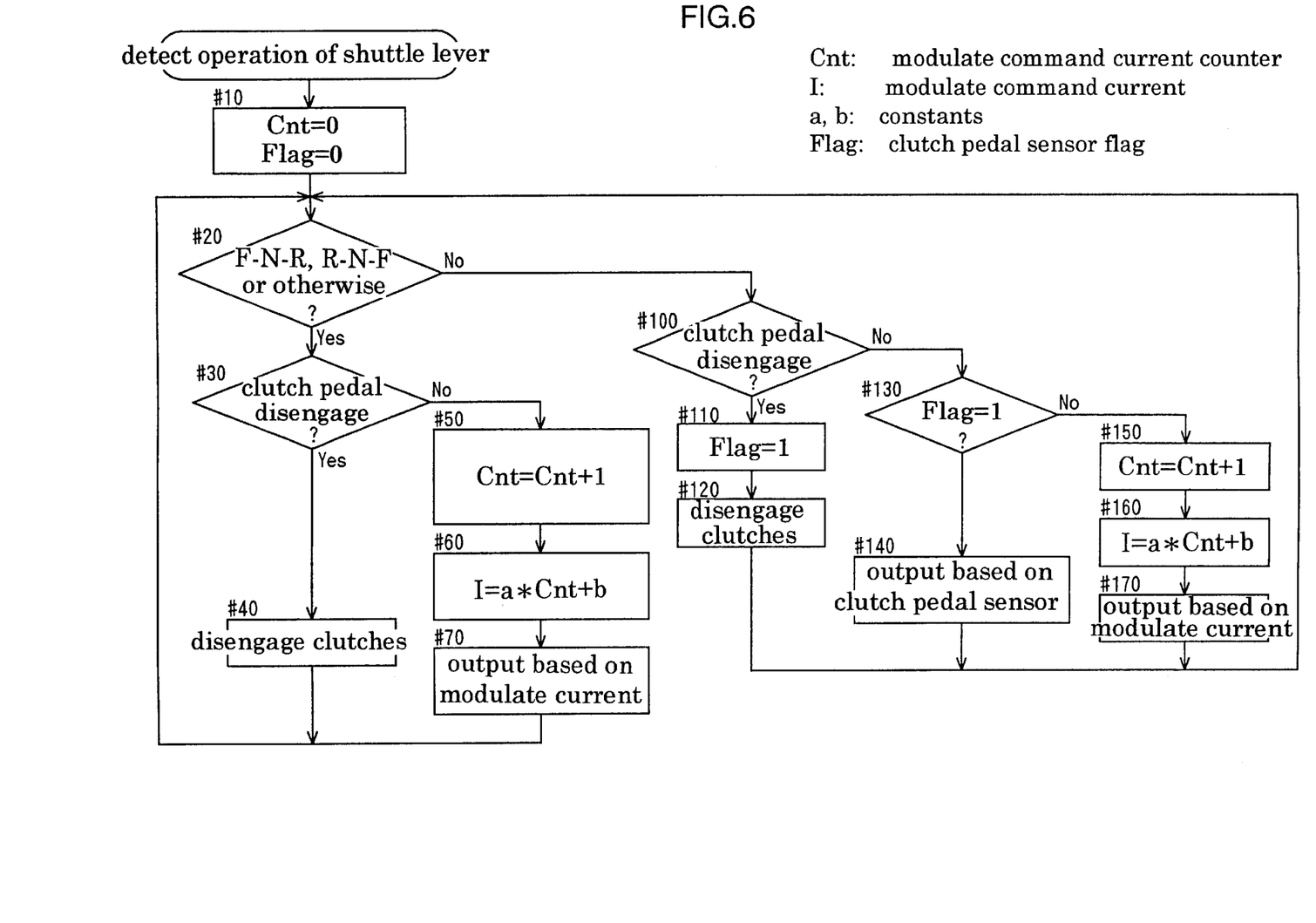
FIG. 6 is a flow chart of controls by the microcomputer unit.

FIG. 6 is a flow chart of a control routine executed by the microcomputer unit 40. This control routine is an interruption routine executed in time of an operation of shuttle lever 41.

In this routine, after an initialization (initialization of a counter and a flag described later, step #10), checking is made first whether the shuttle lever 41 is switched to a reverse side or not, i.e. whether it is switched from forward to neutral and to backward (or from backward to neutral and to forward) (step #20).

When the result is "Yes", checking is made whether the clutch pedal 37 is in the disengaging position (step #30). When the result is "Yes", both the forward drive hydraulic clutch 2F and backward drive hydraulic clutch 2R are disengaged (step #40). When the result is "No", the modulate command current counter (Cnt) is incremented (step #50), and modulate current I=a*Cnt+b is computed (step #60). A and b are constants here, and therefore, modulate current I is a linear function. Based on modulate current I computed, a command current is outputted to the pressure regulating valve (i.e. electromagnetic proportional pressure reducing valve 32A) (step #70).

On the other hand, when the shuttle lever 41 is operated otherwise than forward-neutral-backward (or vice versa) (that is when the control routine branches from step #20 to "No"), checking is made whether the shuttle lever 41 is in neutral (step #100).

When the result is "Yes", pedal sensor flag Flag=1 is set (step #110). Thereafter the forward drive hydraulic clutch 2F and backward drive hydraulic clutch 2R are disengaged (step #120).

When the result is "No", that is when the shuttle lever 41 is operated from forward to neutral and to forward again (or from backward to neutral and to backward again), a test is made to determine whether pedal sensor flag Flag=1 (step #130). When step #130 results in "Yes" (i.e. when it is detected that the clutch pedal 37 was in the disengaging position when the shuttle lever 41 was operated, but now it is in the engaging position), a command current based on the operation of clutch pedal 37 is outputted (step #140). When step #130 results in "No" (pedal sensor flag Flag=0), the modulate command current counter (Cnt) is incremented (step #150), and modulate current I=a*Cnt+b is computed (step #160). Based on computed modulate current I, a command current is outputted to the pressure regulating valve (electromagnetic proportional pressure reducing valve 32A) (step #170).

As will be understood from the above description, when the shuttle lever 41 is operated for the same traveling direction by way of neutral, the pressure for switching the hydraulic clutch 2F or 2R is controlled based on the later of the commands given by the shuttle lever 41 and pedal clutch 37. On the other hand, when the shuttle lever 41 is operated for an opposite traveling direction (i.e. forward-neutral-backward or backward-neutral-forward) across neutral, the pressure for switching the hydraulic clutch 2F or 2R is controlled by the command current based on modulate current I from the point of time when the pedal clutch 37 changes from the disengaging position (i.e. neutral) to the engaging position, regardless of the order in which the commands are given by the shuttle lever 41 and pedal clutch 37.

[Other Embodiments]

This invention is not limited to the foregoing embodiment, but may be modified in various ways.

In the foregoing embodiment, the forward and backward drive hydraulic clutches 2F and 2R are controlled based on the later in time and the smaller in pressure of the command pressure by an operation of clutch pedal 37 and the command pressure by an operation of shuttle lever 41. It is possible to employ, instead of the above control mode, a control based on only one of the commands, for example.

An electromagnetic proportional valve may be used instead of the electromagnetic proportional pressure reducing valve 32A In this case, a separate pressure reducing valve is provided to reduce the hydraulic pressure in the pressure oil line 31.

What is claimed is:

1. A pressure control apparatus for a hydraulic clutch device mounted in a transmission of a vehicle, for modulate controlling a pressure supplied to said hydraulic clutch device, through an electromagnetic proportional valve in response to an operation in a forward direction or a backward direction of a shuttle lever, and for controlling the pressure also in response to a depression of a clutch pedal, said pressure control apparatus comprising:

means for detecting an operating direction of said shuttle lever;

means for detecting a depressed position of said clutch pedal; and control means operable, when said operating direction detecting means detects that said shuttle lever is operated from forward to backward or vice versa, for electrifying said electromagnetic proportional valve after start of a clutch engaging operation of said clutch pedal, to effect a modulated pressure control of a hydraulic clutch corresponding to a side to which said shuttle lever is operated;

wherein, when said operating direction detecting means detects that said shuttle lever is operated from forward to neutral and to forward again or backward to neutral and to backward again, said control means controls said hydraulic clutch device with a pressure corresponding to a depressed position when said pedal position detecting means detects an engaging operation of said pedal clutch, and modulate controls the pressure of said hydraulic clutch device when said pedal position detecting means does not detect the engaging operation of said pedal clutch.

2. A pressure control apparatus as defined in claim 1, wherein said hydraulic clutch device is used both as a backward and forward drive switching clutch operable by said shuttle lever for switching traveling directions, and as a main clutch operable by said clutch pedal for connecting and disconnecting propelling drive.

3. A pressure control method applicable to a hydraulic clutch device mounted in a transmission of a vehicle, for modulate controlling a pressure supplied to said hydraulic clutch device, through an electromagnetic proportional valve in response to an operation of a shuttle lever, and for controlling the pressure also in response to a depression of a clutch pedal, said pressure control method comprising the steps of:

supplying a pressure for backward and forward drive switching to said hydraulic clutch device and modulate controlling said pressure through said electromagnetic proportional valve when said shuttle lever is operated;

supplying a pressure corresponding to a depressed position of said clutch pedal to said hydraulic clutch device when said clutch pedal is operated for clutch engagement;

electrifying said electromagnetic proportional valve after start of a clutch engaging operation of said clutch pedal, when said shuttle lever is operated from forward to backward or vice versa, to modulate control, through said electromagnetic proportional valve, the pressure supplied to said hydraulic clutch device;

controlling said hydraulic clutch device with a pressure corresponding to a depressed position of said clutch pedal when said operating direction detecting means detects that said shuttle lever is operated from forward to neutral and to forward again or backward to neutral and to backward again, and said clutch pedal is operated for clutch engagement; and modulate controlling the pressure for said hydraulic clutch device when said operating direction detecting means detects that said shuttle lever is operated from forward to neutral and to forward again or backward to neutral and to backward again, and said clutch pedal is not operated for clutch engagement.

4. A pressure control method as defined in claim 3, wherein said hydraulic clutch device is used both as a backward and forward drive switching clutch operable by said shuttle lever for switching traveling directions, and as a main clutch operable by said clutch pedal for connecting and disconnecting propelling drive.

* * * * *